United States Patent [19]

Phillion et al.

[11] Patent Number: 5,615,908
[45] Date of Patent: Apr. 1, 1997

[54] DEPLOYMENT DOOR ASSEMBLY

[75] Inventors: Jack A. Phillion, Shelby Township; Jamie L. Klomhaus, North St.; Gary M. Meyers, East China; Richard J. Barton, Fort Gratiot, all of Mich.

[73] Assignees: TRW Vehicle Safety Systems Inc., Lyndhurst, Ohio; Huron Plastics Group, Inc., Port Huron, Mich.

[21] Appl. No.: 478,711

[22] Filed: Jun. 7, 1995

[51] Int. Cl.6 .................................................. B60R 21/20
[52] U.S. Cl. ...................................... 280/728.3; 280/732
[58] Field of Search ............................ 280/728.3, 728.2, 280/732, 731, 730.1, 728.1, 752

[56] References Cited

U.S. PATENT DOCUMENTS

| | | | |
|---|---|---|---|
| 5,082,310 | 1/1992 | Bauer | 280/732 |
| 5,087,067 | 2/1992 | Seki et al. | 280/732 |
| 5,145,207 | 9/1992 | Bederka et al. | 280/728.2 |
| 5,154,444 | 10/1992 | Nelson | 280/732 |
| 5,158,322 | 10/1992 | Sun | 280/732 |
| 5,172,931 | 12/1992 | Baba et al. | 280/728.3 |
| 5,320,380 | 6/1994 | Hamada et al. | 280/728.3 |
| 5,330,223 | 7/1994 | Hiramitsu et al. | 280/728.2 |
| 5,333,901 | 8/1994 | Barnes | 280/732 |
| 5,335,935 | 8/1994 | Proos et al. | 280/728.3 |
| 5,338,060 | 8/1994 | Soderquist | 280/728.3 |
| 5,375,874 | 12/1994 | Zushi | 280/728.3 |
| 5,378,014 | 1/1995 | Cooper | 280/728.3 |
| 5,403,033 | 4/1995 | Koma | 280/728.2 |
| 5,460,403 | 10/1995 | Hansen et al. | 280/732 |
| 5,474,323 | 12/1995 | Davidson | 280/728.2 |
| 5,478,105 | 12/1995 | Yamakawa et al. | 280/728.3 |
| 5,482,313 | 1/1996 | Ikeya et al. | 280/728.3 |
| 5,527,063 | 6/1996 | Garner et al. | 280/728.2 |

FOREIGN PATENT DOCUMENTS

| | | | |
|---|---|---|---|
| 1-122753 | 5/1989 | Japan | 280/728.3 |
| 4-325345 | 11/1992 | Japan . | |
| 5-131888 | 5/1993 | Japan | 280/728.3 |
| 2265119 | 9/1993 | United Kingdom . | |
| 2265338 | 9/1993 | United Kingdom | 280/728.3 |
| 2264677 | 9/1993 | United Kingdom | 280/728.3 |
| 2267064 | 11/1993 | United Kingdom | 280/728.3 |

Primary Examiner—Brian Johnson
Assistant Examiner—Peter C. English
Attorney, Agent, or Firm—Tarolli, Sundheim, Covell, Tummino & Szabo

[57] ABSTRACT

A deployment door assembly (28) covers an inflatable air bag (12) contained in a reaction canister (24) mounted in a vehicle (16). The deployment door assembly (28) includes first and second continuous pieces of plastic material. The first piece defines a substrate (50) having a panel portion (56), first wall portions (170–174), and second wall portions (180–188). The panel portion (56) closes an opening (49) in the vehicle (16), and defines boundaries of a deployment door (32). The first wall portions (170–174) extend across the deployment door (32), and project inward from the deployment door (32). The second wall portions (180–188) surround the deployment door (32), and direct the inflating air bag (12) to move outward from the reaction canister (24) toward and against the first wall portions (170–174). The second continuous piece of plastic material defines an outer layer (52) which covers the substrate (50) in overlying surface contact. An outer side surface (72) of the outer layer (52) continues the trim theme of the vehicle (16) across and around the deployment door (32).

6 Claims, 6 Drawing Sheets

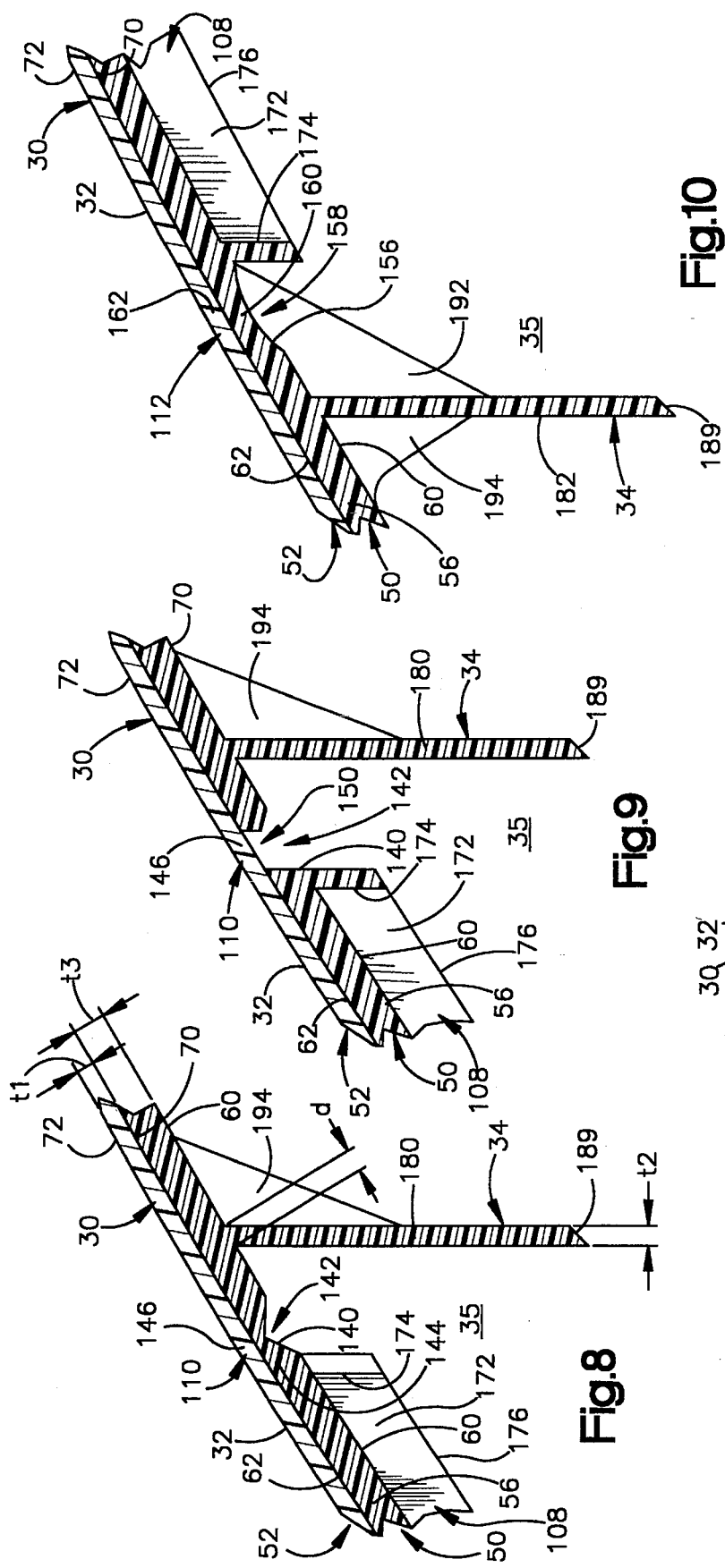

5,615,908

DEPLOYMENT DOOR ASSEMBLY

FIELD OF THE INVENTION

The present invention relates to a deployment door which is opened upon inflation of an air bag in a vehicle.

BACKGROUND OF THE INVENTION

An air bag is inflated to protect an occupant of a vehicle upon the occurrence of a vehicle collision. When the vehicle experiences a collision-indicating condition of at least a predetermined threshold level, an inflator is actuated. The inflator then emits inflation fluid which is directed to flow into the air bag. The inflation fluid inflates the air bag to an inflated condition in which the air bag extends into the vehicle occupant compartment. When the air bag is inflated into the vehicle occupant compartment, it restrains the occupant of the vehicle from forcefully striking parts of the vehicle as a result of the collision.

The air bag and the inflator are typically assembled together as parts of an air bag module which is mounted in the vehicle. In addition to the air bag and the inflator, the module includes a reaction canister which contains the air bag and the inflator. The reaction canister has a deployment opening through which the air bag emerges from the reaction canister when the air bag is inflated.

A deployment door extends over the deployment opening in the reaction canister to conceal the air bag and the other parts of the module from the vehicle occupant compartment. The deployment door may be a part of the module. Alternatively, the deployment door may be a part of a trim panel on the vehicle structure in which the module is mounted. For example, the deployment door may be a part of a trim panel on the vehicle instrument panel.

When the inflator is actuated, the reaction canister directs the inflation fluid to flow from the inflator into the air bag. As the inflation fluid enters the air bag, it moves the air bag outward from the reaction canister through the deployment opening and forcefully against the deployment door. The deployment door is ruptured by the force of the fluid pressure in the air bag, and is thus released for movement away from the deployment opening. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag inflates outward from the reaction canister through the deployment opening and into the vehicle occupant compartment.

SUMMARY OF THE INVENTION

The present invention comprises a deployment door assembly for covering an inflatable occupant restraint in a vehicle. Specifically, the deployment door assembly covers an inflatable occupant restraint contained in a canister in a vehicle. In accordance with the present invention, the deployment door assembly comprises first and second continuous pieces of plastic material. The first continuous piece of plastic material defines a substrate. The second continuous piece of plastic material defines an outer layer which overlies the substrate.

The substrate has distinct portions including a panel portion, first wall portions, and second wall portions. The panel portion comprises means for closing an opening in the vehicle. The panel portion has a peripheral edge surface, and includes means for defining boundaries of a deployment door which is spaced fully from the peripheral edge surface. The panel portion further has oppositely facing inner and outer side surfaces which are bounded by the peripheral edge surface, and which extend across and around the deployment door.

The first wall portions of the substrate extend across the deployment door, and project inward from the inner side surface at the deployment door. The second wall portions of the substrate comprise means for directing the inflatable restraint to move outward from the canister toward and against the first wall portions when the inflatable restraint is inflating. The second wall portions project inward from the inner side surface of the panel portion, and surround the deployment door.

The outer layer has an inner side surface which covers the outer side surface on the substrate in overlying surface contact. The outer layer further has an outer side surface which comprises means for continuing the trim theme of the vehicle across and around the deployment door.

BRIEF DESCRIPTION OF THE DRAWINGS

Further features of the present invention will become apparent to those skilled in the art to which the present invention relates from reading the following description with reference to the accompanying drawings, in which:

FIG. 8 is a view taken on line 8—8 of FIG. 5;

FIG. 9 is a view taken on line 9—9 of FIG. 5;

FIG. 10 is a view taken on line 10—10 of FIG. 5; and

FIG. 11 is a view taken on line 11—11 of FIG. 5.

DESCRIPTION OF A PREFERRED EMBODIMENT

Figure 1:
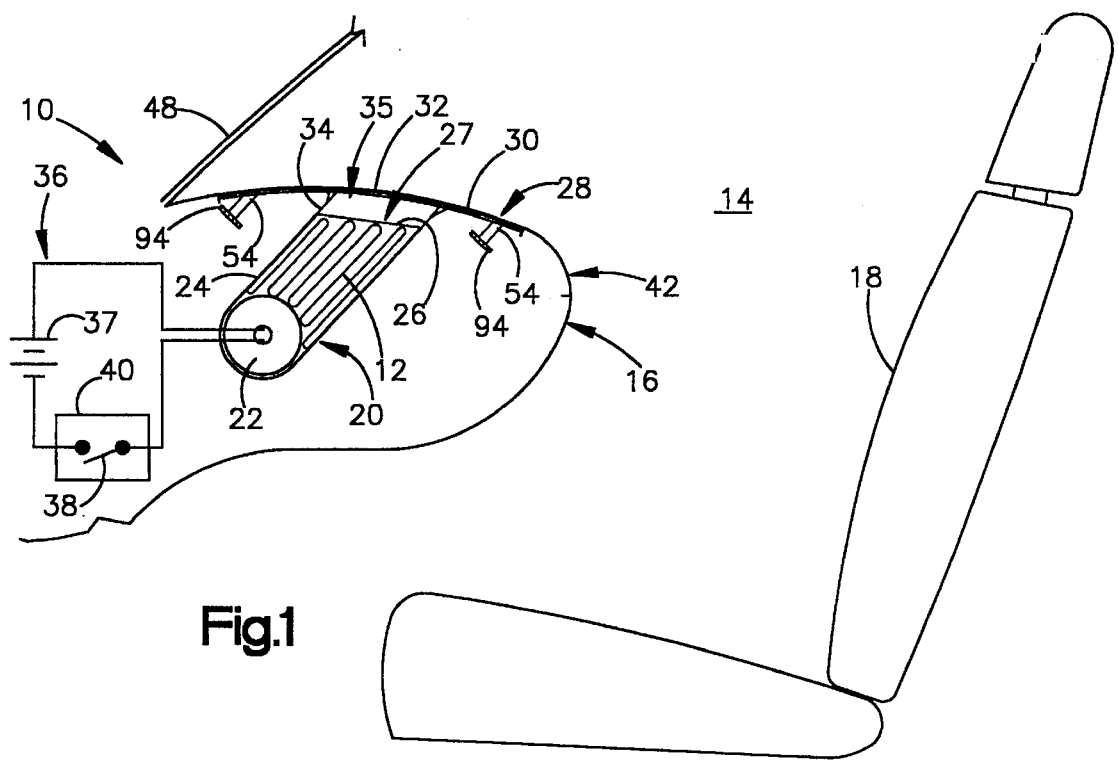
FIG. 1 is a schematic view showing a vehicle occupant restraint apparatus comprising a first embodiment of the present invention.
Figure 2:
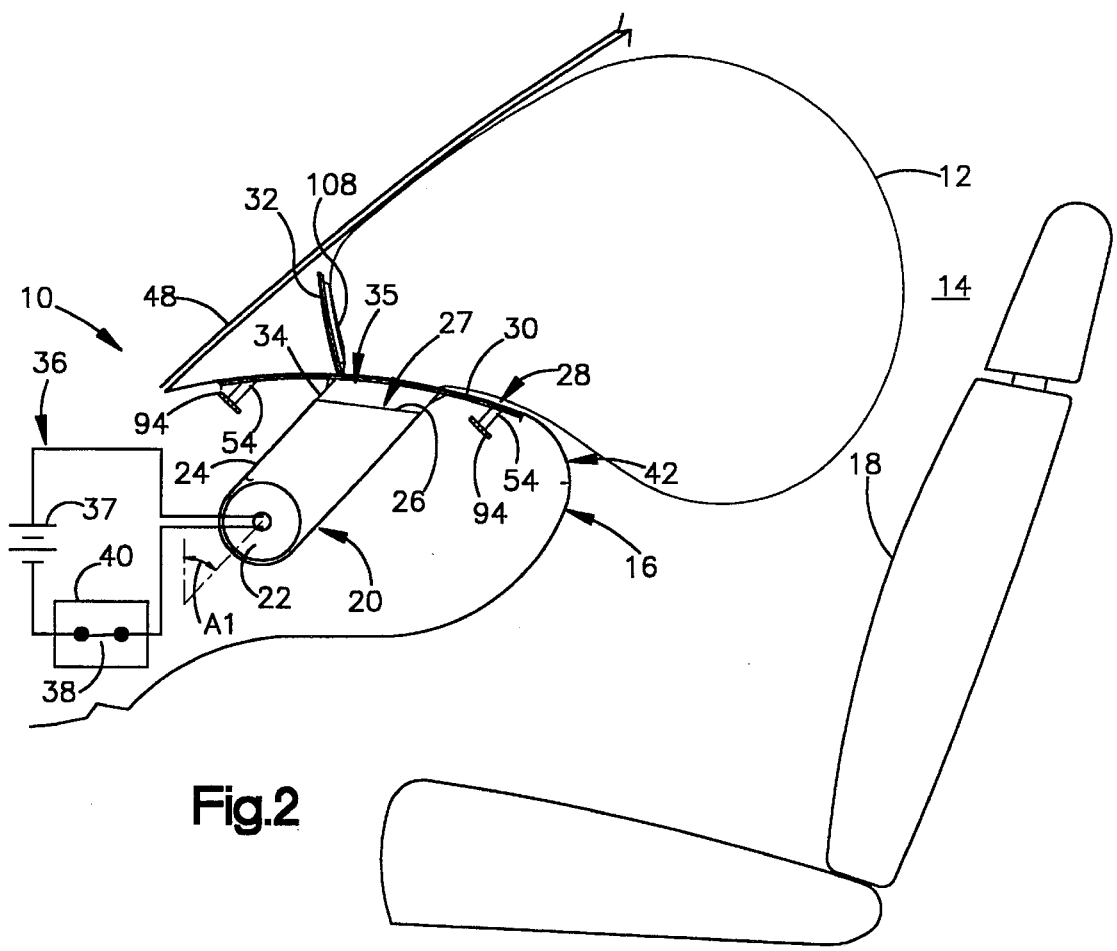
FIG. 2 is a schematic view showing the apparatus of FIG. 1 in an actuated condition.

As shown schematically in FIGS. 1 and 2, a vehicle occupant restraint apparatus 10 comprising a preferred embodiment of the present invention includes an inflatable vehicle occupant restraint 12, which is commonly referred to as an air bag. The air bag 12 is inflatable from an uninflated condition, as shown in FIG. 1, to an inflated condition, as shown in FIG. 2. When the air bag 12 is inflated, it moves into the vehicle occupant compartment 14 between the vehicle instrument panel 16 and an adjacent vehicle seat 18. The air bag 12 then restrains movement of an occupant of the seat 18 toward the instrument panel 16 to help protect the occupant from a forceful impact with the instrument panel 16 or other parts of the vehicle.

The air bag 12 is part of an air bag module 20 which is mounted in the instrument panel 16 at the passenger side of the vehicle. In addition to the air bag 12, the module 20 includes an inflator 22 for inflating the air bag 12, and includes a reaction canister 24 which contains the air bag 12 and the inflator 22. The air bag 12 and the inflator 22 are fixed to the reaction canister 24 in a known manner, and the reaction canister 24 is mounted in instrument panel 16 in a known manner. An outer end 26 of the reaction canister 24 is open so as to define a deployment opening 27 through which the air bag 12 emerges from the reaction canister 24 when inflating. Although the reaction canister 24 in the preferred embodiment of the present invention is a separate structure which is mounted in the instrument panel 16, such a canister could alternatively be defined by the structure of the instrument panel 16, or by another part of the vehicle from which the air bag 12 is to be inflated into the vehicle occupant compartment 14.

The apparatus 10 further includes a deployment door assembly 28 which is mounted on the instrument panel 16. The deployment door assembly 28 includes a deployment panel 30 which, in turn, includes a deployment door 32. The deployment panel 30 covers the module 20 to conceal the module 20 from the vehicle occupant compartment 14. The deployment door 32 is pivotal from a closed position, as shown in FIG. 1, to an opened position, as shown in FIG. 2. A base 34 of the deployment door assembly 28 extends inward from the deployment panel 30 to the module 20. The base 34 defines a chute 35 through which the inflating air bag 12 moves from the deployment opening 27 toward the deployment door 32.

The inflator 22 comprises a source of inflation fluid for inflating the air bag 12. As known in the art, the inflator 22 may contain an ignitable gas generating material which, when ignited, rapidly generates a large volume of gas. The inflator 22 may alternatively contain a stored quantity of pressurized inflation fluid, or a combination of pressurized inflation fluid and ignitable material for heating the inflation fluid.

The inflator 22 is included in an electrical circuit 36. The electrical circuit 36 further includes a power source 37, which is preferably the vehicle battery and/or a capacitor, and a normally open switch 38. The switch 38 is part of a sensor 40 which senses a condition indicating the occurrence of a vehicle collision. The collision-indicating condition may comprise, for example, sudden vehicle deceleration caused by a collision. If the collision-indicating condition is above a predetermined threshold, it indicates the occurrence of a collision for which inflation of the air bag 12 is desired to protect an occupant of the vehicle. The sensor 40 then closes the switch 38, and the inflator 22 is actuated electrically.

When the inflator 22 is actuated, it emits a large volume of inflation fluid into the reaction canister 24. The reaction canister 24 directs the inflation fluid from the inflator 22 into the air bag 12 to inflate the air bag 12. As the air bag 12 begins to inflate, it moves rapidly outward through the chute 35 and forcefully against the deployment door 32. The air bag 12 then pivots the deployment door 32 outward from the closed position to the opened position. As the air bag 12 continues to inflate, it moves outward into the vehicle occupant compartment 14 past the deployment door 32.

Figure 3:
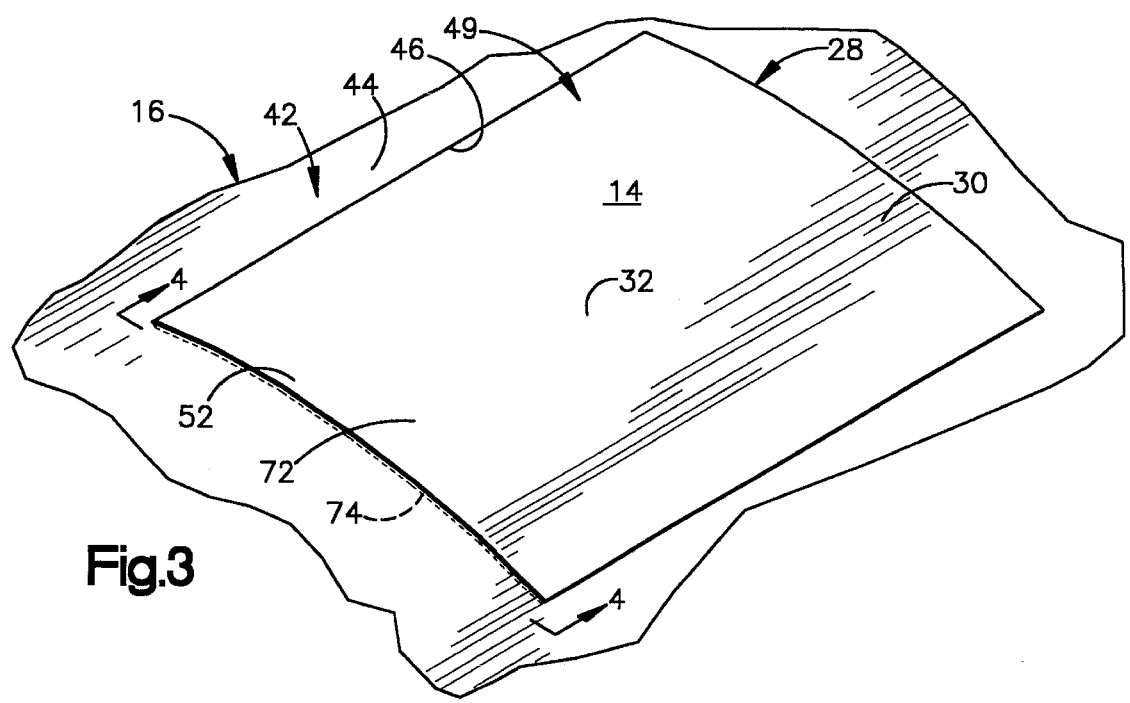
FIG. 3 is a perspective view of parts shown in FIG. 1.

In the embodiment of the present invention shown in FIGS. 1 and 2, the air bag module 20 is mounted in the instrument panel 16 in an arrangement known as a top mount. The air bag 12 is thus inflated outward from an upper portion 42 of the instrument panel 16 which is known as a topper pad. As shown in FIG. 3, the topper pad 42 has an upper surface 44 and an inner edge surface 46. The upper surface 44 faces upward into the vehicle occupant compartment 14, and thus faces partially toward the vehicle windshield 48 (FIGS. 1 and 2). The inner edge surface 46 defines a rectangular opening 49. The deployment panel 30 on the deployment door assembly 28 also is rectangular, and extends fully across the opening 49 in the topper pad 42 to continue the contour of the topper pad 42 across the opening 49. The deployment door 32 thus faces partially toward the windshield 48. More specifically, the air bag 12 is inflated at a deployment angle A1 (FIG. 2), which is measured from a vertical line and which directs the air bag 12 into contact with the windshield 48. Tethers or the like (not shown) can be used to control interaction of the inflating air bag 12 with the windshield 48 in any suitable manner known in the art.

Figure 4:
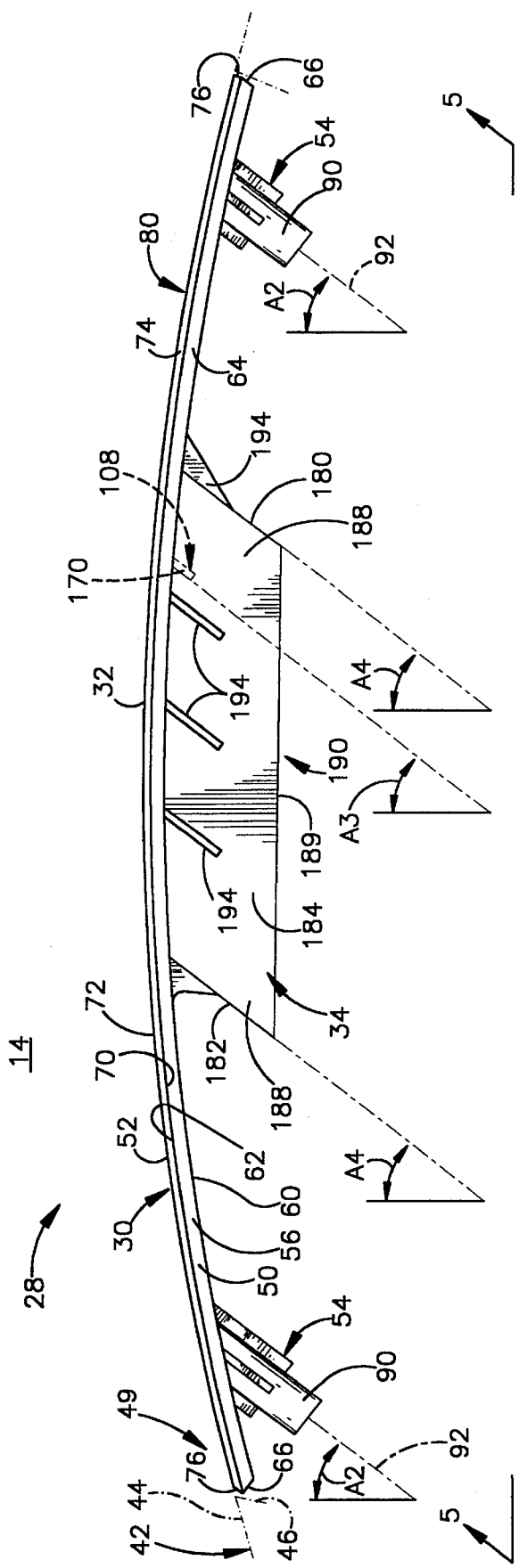
FIG. 4 is a view taken on line 4—4 of FIG. 3.

The deployment door assembly 28 is a plastic part which is defined by two plastic pieces that are joined together. As shown in FIG. 4, the two plastic pieces which together define the deployment door assembly 28 are a substrate 50 and an outer layer 52. The substrate 50 and the outer layer 52 are preferably formed and joined together in a molding process which is set forth in copending U.S. patent application Ser. No. 08/488,265, filed Jun. 7, 1995, entitled "Process and Apparatus for Manufacturing a Deployment Door Assembly."

The substrate 50 is a continuous piece of plastic material. The plastic material of which the substrate 50 is formed may have any suitable composition known in the art. The substrate 50 includes the base 34, and further includes a plurality of mounting bosses 54 for mounting the deployment door assembly 28 on the instrument panel 16. The outer layer 52 also is a continuous piece of a plastic material which may have any suitable composition known in the art. However, the plastic material of the outer layer 52 is preferably less rigid than the plastic material of the substrate 50. The outer layer 52 overlies a panel portion 56 of the substrate 50. The outer layer 52 and the substrate panel 56 together define the deployment panel 30.

Figure 5:
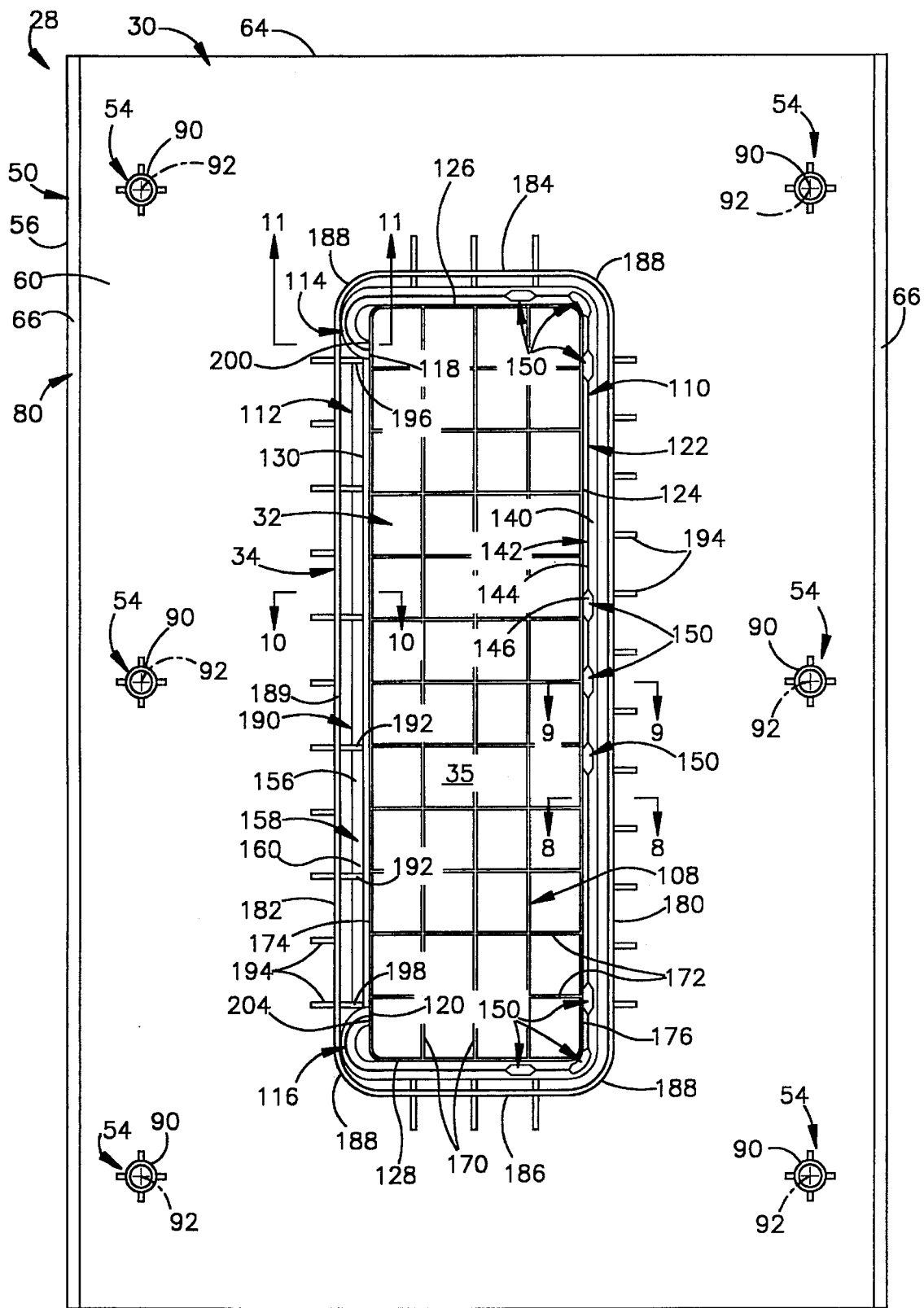
FIG. 5 is a view taken on line 5—5 of FIG. 4.

The substrate panel 56 has oppositely facing inner and outer side surfaces 60 and 62. A peripheral edge surface 64 of the substrate panel 56 fully surrounds the inner and outer side surfaces 60 and 62. As shown in FIG. 5, a pair of beveled portions 66 of the edge surface 64 extend fully along the length of the substrate panel 56.

The outer layer 52 similarly has oppositely facing inner and outer side surfaces 70 and 72 surrounded by a peripheral edge surface 74. The edge surface 74 of the outer layer 52 extends alongside, and is longitudinally coextensive with, the edge surface 64 of the substrate panel 56. A pair of beveled portions 76 of the edge surface 74 lie in planes that are parallel to each other. The beveled portions 76 of the edge surface 74 extend alongside the beveled portions 66 of the edge surface 64. Accordingly, the deployment panel 30 has a peripheral edge surface 80 which is defined in part by each of the adjacent edge surfaces 64 and 74. The peripheral edge surface 80 of the deployment panel 30 is shaped to mate with the surrounding inner edge surface 46 of the topper pad 42, as indicated in FIGS. 3 and 4.

The outer layer 52 has a constant thickness t1 (FIG. 8) between the inner and outer side surfaces 70 and 72. The inner side surface 70 of the outer layer 52 fully covers the outer side surface 62 of the substrate panel 56 in overlying surface contact. As shown in FIG. 4, the inner and outer side surfaces 70 and 72 of the outer layer 52 are slightly offset from each other at the beveled portions 76 of the peripheral edge surface 74, but have the same size, shape, and contour. The outer side surface 72 extends fully across the opening 49 in the topper pad 42, as shown in FIG. 3. Additionally, the texture and/or the color of the outer side surface 72 is preferably complimentary to that of the surrounding surface 44 of the topper pad 42. The outer side surface 72 thus continues the trim theme of the topper pad 42 across the opening 49. In accordance with this feature of the present invention, the plastic material of the outer layer 52 may have the same hardness as the plastic material of the topper pad 42.

As shown in FIGS. 4 and 5, the mounting bosses 54 project inward from the deployment panel 30 at locations between the base 34 and the peripheral edge surface 80. The mounting bosses 54 are integral portions of the substrate 50, and project inward from the inner side surface 60 of the substrate panel 56. Each mounting boss 54 has a cylindrical outer surface 90 centered on a respective axis 92. The axes 92 are parallel to each other. When the deployment door assembly 28 is mounted on the instrument panel 16, as shown in FIG. 4, each axis 92 is inclined from a vertical line at an angle A2. The angles A2 are equal to each other, and are equal to the deployment angle A1 (FIG. 2) of the air bag 12.

Figure 6A:
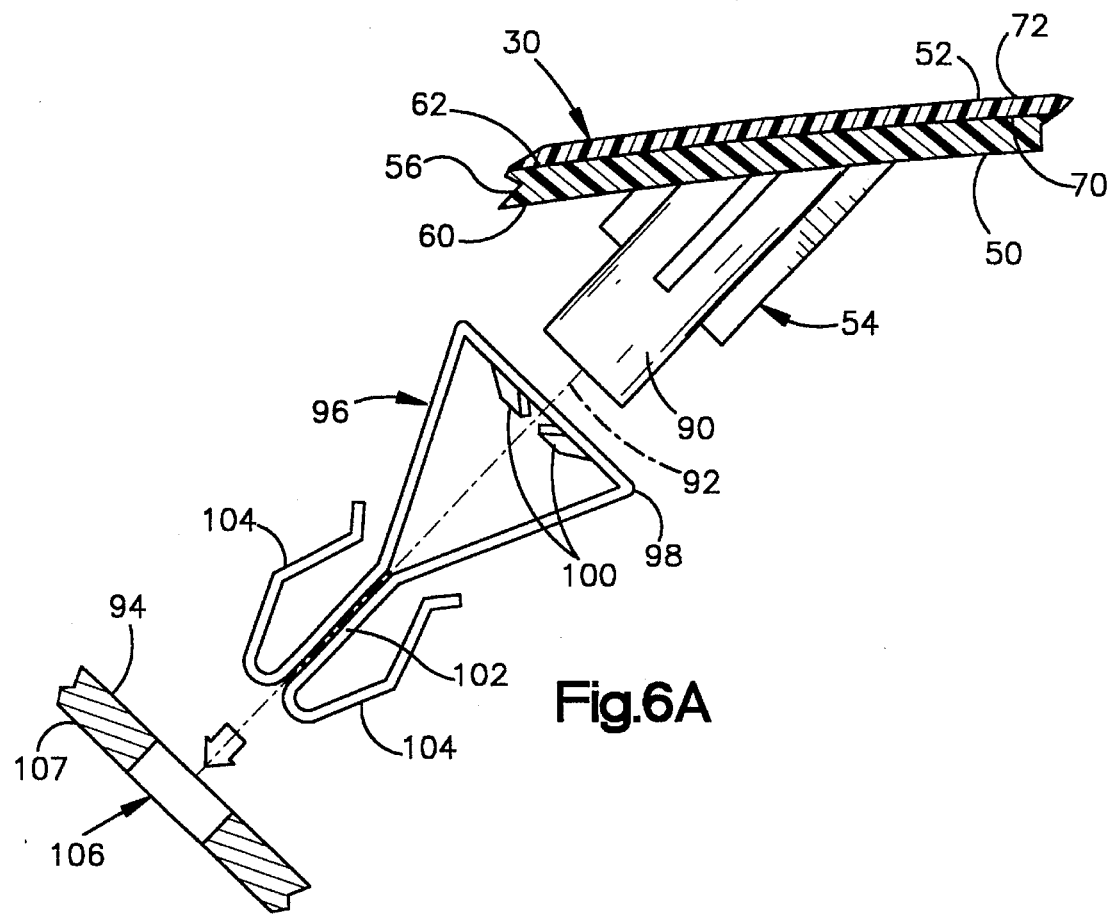
FIGS. 6A and 6B are partial side views showing parts of the apparatus of FIG. 1.
Figure 6B:
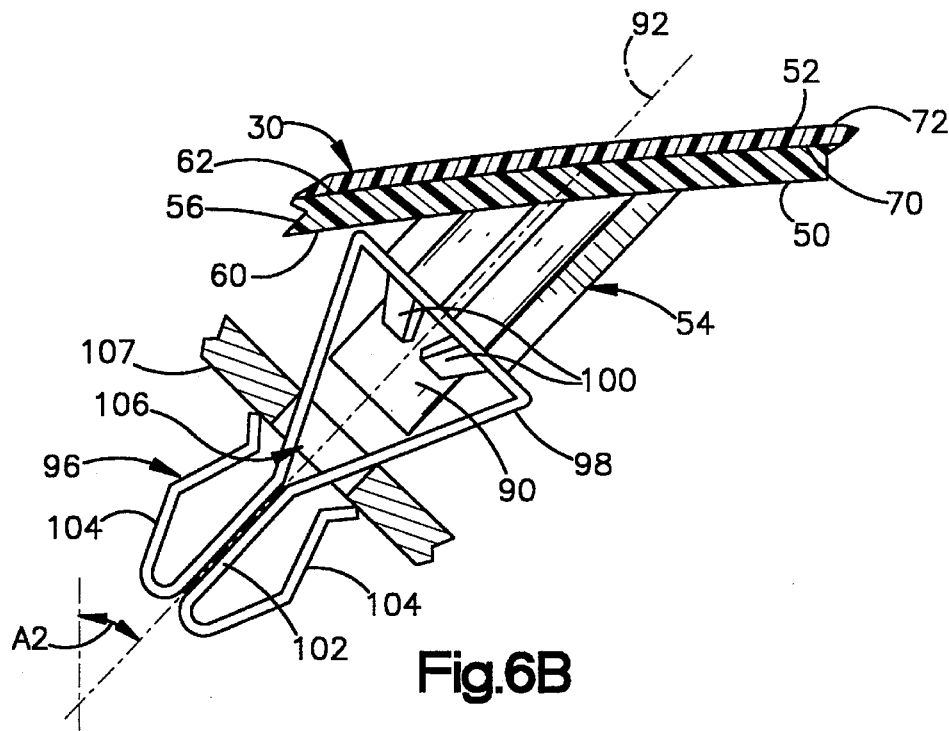

The deployment door assembly 28 is fastened to portions 94 of the instrument panel 16 which are spaced from the reaction canister 24, as shown in FIG. 1. Each mounting boss 54 is fastened directly to a corresponding portion 94 of the instrument panel 16 by a corresponding fastener 96, as shown in FIG. 6A and 6B. Each fastener 96 has a head 98 with a plurality of barbs 100, and has a stem 102 with a pair of spring arms 104.

When the head 98 of a fastener 96 is received over the corresponding mounting boss 54, as shown in FIG. 6B, the barbs 100 cut into the mounting boss 54 at the cylindrical outer surface 90 so as to block removal of the fastener 96 from the mounting boss 54. The stem 102 of the fastener 96 is receivable through an aperture 106 in the corresponding portion 94 of the instrument panel 16, as indicated by the arrow shown in FIG. 6A. When the stem 102 is moved through the aperture 106, the spring arms 104 are first deflected toward each other, and subsequently move resiliently away from each other to the positions in which they are shown in FIG. 6B. The spring arms 104 then engage an inner surface 107 of the corresponding portion 94 of the instrument panel 16 so as to block removal of the stem 102 from the aperture 106. Each fastener 96 fastens the corresponding mounting boss 54 securely to the instrument panel 16 in this manner. Although the foregoing structures of the mounting bosses 54 and the fasteners 96 are preferred, any suitable alternative structures may be used.

As best shown in FIG. 5, the deployment door 32 has a generally rectangular peripheral shape and is located at the center of the deployment panel 30. A grid structure 108 at the inside of the deployment door 32 has the same generally rectangular peripheral shape. The deployment door 32 could be offset from the center of the deployment panel 30, depending upon considerations such as the orientation of the topper pad 42 relative to the vehicle occupant compartment 14, and/or the deployment angle A1 (FIG. 2) of the air bag 12. In any case, the deployment door 32 is spaced fully from the peripheral edge surface 80 of the deployment panel 30.

The peripheral shape of the deployment door 32 is defined by a stress riser 110 and a hinge 112 which together extend fully around the perimeter of the deployment door 32. The stress riser 110 has first and second opposite end portions 114 and 116. The opposite end portions 114 and 116 extend along semi-circular, hook-shaped paths to respective opposite terminal ends 118 and 120 of the stress riser 110. A major portion 122 of the stress riser 110 extends between the end portions 114 and 116 in a U-shaped path extending along three sides of the deployment door 32. The major portion 122 of the stress riser 110 thus defines one long side 124 and two short sides 126 and 128 of the deployment door 32. The hinge 112 extends in a straight line between the opposite end portions 114 and 116 of the stress riser 110. The hinge 112 thus defines another long side 130 of the deployment door 32.

The stress riser 110 is defined in part by the substrate panel 56, and in part by the outer layer 52. As best shown in FIG. 8, a recessed surface 140 of the substrate panel 56 defines a groove 142. The groove 142 extends along the entire length of the stress riser 110, and has a depth extending from the inner side surface 60 of the substrate panel 56 toward the outer side surface 62. A lower portion 144 of the stress riser 110 is defined by the relatively thin plastic material of the substrate panel 56 which is located between the recessed surface 140 and the outer side surface 62. An upper portion 146 of the stress riser 110 is defined by the adjacent plastic material of the outer layer 52 which extends fully between the inner and outer side surfaces 70 and 72 of the outer layer 52. Importantly, the contour of the outer side surface 72 is not affected by the structure of the stress riser 110. The outer side surface 72 thus extends fully across and around the deployment door 32 without interruption at the boundaries of the deployment door 32, as shown in FIG. 3, so that the outline of the deployment door 32 is not visible from the vehicle occupant compartment 14.

A plurality of initiator openings 150 are spaced apart along the length of the stress riser 110, as shown in FIG. 5. As best shown in FIG. 9, each initiator opening 150 extends through the substrate panel 56 at the bottom of the groove 142. Each initiator opening 150 thus interrupts the stress riser 110 at the lower portion 144 (FIG. 8) of the stress riser 110.

The hinge 112 is somewhat similar to the stress riser 110 in that the hinge 112 is defined in part by the substrate panel 56 and in part by the outer layer 52. As best shown in FIG. 10, a slightly recessed surface 156 of the substrate panel 56 defines a shallow groove 158. The groove 158 extends along nearly the entire length of the hinge 112 between the opposite end portions 114 and 116 (FIG. 5) of the stress riser 110. The width of the hinge 112 is approximately equal to the width of the groove 158. A lower portion 160 of the hinge 112 is defined by the relatively thin plastic material of the substrate panel 56 which is located between the recessed surface 156 and the outer side surface 62. An upper portion 162 of the hinge 112 is similarly defined by the adjacent plastic material of the outer layer 52 which extends fully between the inner and outer side surfaces 70 and 72 of the outer layer 52. The two portions 160 and 162 of the hinge 112 together define the thickness of the hinge 112.

The thickness of the hinge 112 is somewhat less than the thickness of the adjacent portions of the deployment panel 30 on opposite sides of the groove 158. This promotes bending at the hinge 112 when the inflating air bag 12 opens the deployment door 32, as described fully below. However, the hinge 112 is both wider and thicker than the stress riser 110 (FIG. 8). This helps to ensure that the force of the inflating air bag 12 ruptures the deployment panel 30 at the stress riser 110 rather than at the hinge 112. Such rupturing also is described fully below. Like the stress riser 110, the hinge 112 does not affect the contour of the outer side surface 72 of the outer layer 52.

The grid structure 108 is an integral portion of the substrate 50. The grid structure 108 includes a plurality of walls which project inward from the inner side surface 60 of the substrate panel 56 at the deployment door 32. These include first and second grid walls 170 and 172. The first grid walls 170 extend along the length of the deployment door 32, and are parallel and equally spaced from each other. The second grid walls 172 extend across the width of the deployment panel 30, and also are parallel and equally spaced from each other. The first and second grid walls 170 and 172 thus intersect each other at right angles so as to define a rectangular grid at the inside of the deployment door 32. A third grid wall 174 extends around the perimeter of the deployment door 32 and encloses the grid defined by the first and second grid walls 170 and 172.

Figure 7:
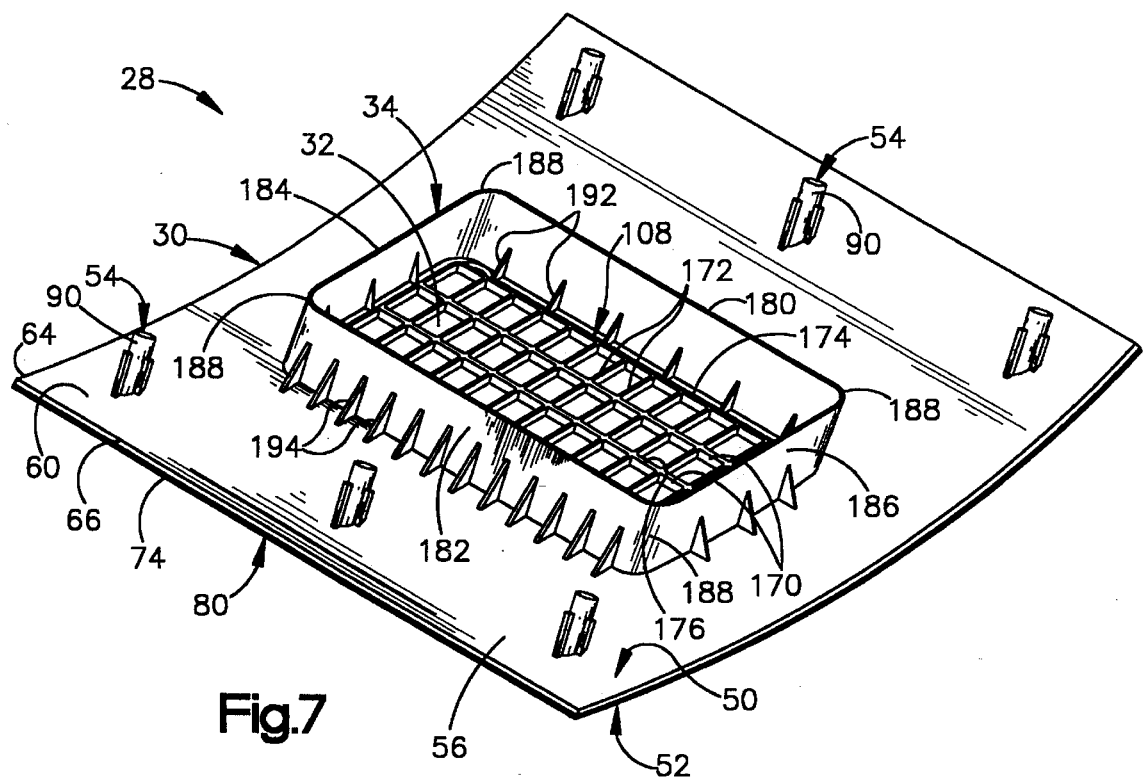
FIG. 7 is a perspective view of the part shown in FIG. 5.

As best shown in FIG. 7, the grid walls 170, 172 and 174 project equal distances inward from the deployment door 32. The grid walls 170, 172 and 174 have a common lower edge surface 176 which defines the lower end of the grid structure 108. When the deployment door assembly 28 is mounted on the instrument panel 16, as shown in FIG. 4, each of the grid walls 170, 172 and 174 projects inward from the deployment door 32 in a direction which is inclined from a vertical line at an angle A3. The angle A3 is equal to the angles A2 at the mounting bosses 54.

The base 34 of the deployment door assembly 28 also projects inward from the substrate panel 56. The base 34 has a generally rectangular shape defined by a pair of parallel side walls 180 and 182 and a pair of parallel end walls 184 and 186. One side wall 180 extends closely alongside the stress riser 110 adjacent to the first long side 124 of the deployment door 32. The other side wall 182 extends closely alongside the hinge 112 adjacent to the second long side 130 of the deployment door 32. The end walls 184 and 186 extend closely alongside the stress riser 110 adjacent to the short sides 126 and 128, respectively, of the deployment door 32. The four corners of the base 34 are closed by four curved corner walls 188 which together join the other base walls 180, 182, 184 and 186 to each other. Accordingly, the base 34 closely surrounds the stress riser 110, the hinge 112, the deployment door 32, and the grid structure 108. Moreover, a lower edge surface 189 of the base 34 defines an opening 190 which extends fully across the base 34. The opening 190 defines an inner end of the chute 35. The size and shape of the opening 190 at the inner end of the chute 35 are approximately equal to the size and shape of the deployment opening 27 at the outer end 26 of the reaction canister 24 (FIG. 1).

A particular feature of the present invention relates to the juncture of the base 34 with the substrate panel 56. The base 34 intersects the substrate panel 56 at the inner side surface 60. As shown in FIG. 8 with reference to the side wall 180, each of the base walls 180–188 has a thickness t2, and the substrate panel 56 has a thickness t3. The plastic material of the side wall 180 is continuous with the plastic material of the substrate panel 56 throughout a distance d. The distance d is measured through the side wall 180 at the intersection of the side wall 180 and the substrate panel 56, i.e., at the inner side surface 60. The distance d is thus determined by the wall thickness t2 and the angle at which side wall 180 intersects the substrate panel 56. In accordance with the present invention, the distance d is not greater than 60 percent of the thickness t3 of the substrate panel 56. This helps to ensure that the plastic material of the substrate 50 does not cool and shrink unevenly at that location when the substrate 50 is formed in a molding process. As a result, the desired contour of the outer side surface 62 is maintained across the juncture of the base 34 with the substrate panel 56.

When the deployment door assembly 28 is mounted on the instrument panel 16 (FIG. 4), the end walls 184 and 186 of the base 34 are substantially vertical. However, each of the side walls 180 and 182 is inclined from a vertical plane at an angle A4. The angles A4 are equal to each other, and are equal to the angles A2 and A3 at the mounting bosses 54 and the grid structure 108, respectively.

The substrate 50 further includes a plurality of triangular gussets extending between the substrate panel 56 and the base 34. These include inner gussets 192 at the inside of the base 34, and outer gussets 194 at the outside of the base 34. The inner gussets 192 extend across the hinge 112 and are perpendicular to the hinge 112. A first inner gusset 196 adjoins the first terminal end 118 of the stress riser 110 at the first hook-shaped end portion 114 of the stress riser 110. A second inner gusset 198 likewise adjoins the second terminal end 120 of the stress riser 110 at the second hook-shaped end portion 116 of the stress riser 110.

When the air bag 12 is inflated upon the occurrence of a vehicle collision, as described above with reference to FIGS. 1 and 2, the base 34 of the deployment door assembly 28 directs the air bag 12 to move outward through the chute 35 from the deployment opening 27 to the deployment door 32. As the air bag 12 inflates and expands outward through the chute 35, the surrounding walls 180–188 of the base 34 constrain the air bag 12 to remain substantially within the perimeter of the deployment door 32. The air bag 12 is thus directed to move against the grid structure 108 at the inside of the deployment door 32.

The inflation fluid in the air bag 12 causes the air bag 12 to apply a fluid pressure force to the lower edge surface 176 of the grid structure 108. The grid walls 170–174 transmit the fluid pressure force to the deployment door 32, and also distribute the fluid pressure force fully across the inside of the deployment door 32. This induces stress evenly along the length of the stress riser 110 at the three sides 124, 126 and 128 of the deployment door 32. When the stress reaches a predetermined elevated level, the stress riser 110 ruptures so that a tear propagates throughout the length of the stress riser 110. The deployment door 32 is then released for pivotal movement about the hinge 112 from the closed position of FIG. 1 to the opened position of FIG. 2.

The stress riser 110 first ruptures at the locations of the initiator openings 150 (FIG. 5). This is because the stress is concentrated in the upper portion 146 (FIG. 9) of the stress riser 110 at those locations. The stress riser 110 thus begins to rupture along the middle of the first long side 124 of the deployment door 32, and also at the corners of the deployment door 32 between the first long side 124 and the two short sides 126 and 128. This causes the stress riser 110 to rupture fully around the three sides 124, 126 and 128 of the deployment door 32 adjacent to the stress riser 110 before the stress can cause undesirable rupturing of the plastic material along the fourth side 130 adjacent to the hinge 112.

In accordance with the foregoing feature of the present invention, the stress riser 110 is constructed so that the tear is stopped at the terminal ends 118 and 120 of the stress riser 110. As shown in FIG. 11, the substrate panel 56 has a surface 200 in a plane 202 which is perpendicular to the opposite side surfaces 60 and 62. The surface 200 defines an end of the groove 142. Therefore, the first terminal end 118 of the stress riser 110 is defined where the plane 202 intersects the upper and lower portions 146 and 144 of the stress riser 110. Since the plane 202 extends through the full thickness T of the deployment panel 30, the full thickness T of the plastic material is provided to resist propagation of the tear beyond the first terminal end 118. The second terminal end 120 (FIG. 5) of the stress riser 110 is likewise defined by another planar surface 204 at the opposite end of the groove 142. Additionally, the hook-shaped paths of the opposite end portions 114 and 116 of the stress riser 110 direct the tear to propagate in directions that turn away from the hinge 112. This helps to ensure that the hinge 112 remains intact and that the bending stresses induced in the deployment door 32 are concentrated at the hinge 112. Further in accordance with this feature of the present invention, the first and second inner gussets 196 and 198 are located so as to block propagation of the tear in directions extending along the hinge 112.

As described above with reference to FIG. 4, each of the side walls 180 and 182 of the base 34 is inclined from a vertical plane at an angle A3. The angles A3 are approximately equal to the deployment angle A1 (FIG. 2) of the air bag 12. Accordingly, each of the side walls 180 and 182 directs the air bag 12 to move toward and against the grid structure 108 at the deployment angle A1. The angles A2 at the mounting bosses 54 also are approximately equal to the deployment angle A1. The fluid pressure force applied to the deployment panel 30 by the air bag 12 thus acts predominantly in a direction parallel to the axes 92 of the mounting bosses 54. This minimizes bending or twisting in the mounting bosses 54 and the fasteners 96 so that the mounting bosses 54 and the fasteners 96 remain securely connected to each other, and to the instrument panel 16, as shown in FIG. 6B. Additionally, since the angles A1, A2 and A3 are equal to each other, the mounting bosses 54, the grid structure 108, and the base 34 can be removed together from a mold cavity in a single direction. The gussets 192 and 194 are also aligned accordingly. This simplifies the process of forming the substrate 50 as a continuous piece of plastic material.

The present invention has been described with reference to a preferred embodiment. From the foregoing description of the invention, those skilled in the art will perceive improvements, changes and modifications. For example, the shapes and sizes of the deployment door and the deployment panel could vary. The deployment door assembly could have a different location on the instrument panel, such as a mid-mount location. Moreover, a vehicle occupant restraint system may include one or more air bags that inflate upon the occurrence of front, rear, and/or side impacts to the vehicle. The air bags can be mounted in parts of the vehicle other than the instrument panel. Such other parts of the vehicle include, for example, the doors, the pillars, the roof, and the seats. A deployment door assembly constructed in accordance with the present invention could be used with an air bag and the corresponding vehicle trim structure at any of those locations. Such improvements, changes and modifications within the skill of the art are intended to be covered by the appended claims.

Having described the invention, the following is claimed:

1. Apparatus for covering an inflatable occupant restraint contained in a canister in a vehicle, said apparatus comprising:
a first continuous piece of plastic material defining a substrate, said substrate having a panel portion, first wall portions, and second wall portions;
said panel portion comprising means for closing an opening in the vehicle, said panel portion having a peripheral edge surface and including means for defining boundaries of a deployment door which is spaced fully from said peripheral edge surface, said panel portion further having oppositely facing inner and outer side surfaces bounded by said peripheral edge surface and extending across and around said deployment door;
said first wall portions extending across said deployment door and projecting inward from said inner side surface at said deployment door;
said second wall portions comprising means for directing the inflatable restraint to move outward from the canister toward and against said first wall portions when the inflatable restraint is inflating, said second wall portions projecting inward from said inner side surface and surrounding said deployment door; and
a second continuous piece of plastic material defining an outer layer having oppositely facing inner and outer side surfaces, said inner side surface of said outer layer covering said outer side surface on said substrate in overlying surface contact, said outer side surface of said outer layer comprising means for continuing a trim theme of the vehicle across and around said deployment door;
said substrate further having mounting portions comprising means for mounting said apparatus on the vehicle at locations spaced from the canister, said mounting portions projecting inward from said panel portion at locations between said wall portions and said peripheral edge surface;
said mounting portions of said substrate comprising mounting bosses projecting inward from said panel portion along respective central axes, said axes being parallel to each other and inclined from a vertical line at a first angle, each of said first wall portions being inclined from a vertical plane at a second angle equal to said first angle.

2. Apparatus as defined in claim 1 wherein a pair of said second wall portions are inclined from a vertical plane at a third angle equal to said first and second angles.

3. Apparatus for covering an inflatable occupant restraint contained in a canister in a vehicle, said apparatus comprising:
a part having a panel portion, first wall portions, second wall portions, and mounting portions;
said panel portion comprising means for closing an opening in the vehicle, said panel portion having a peripheral edge surface and including a deployment door spaced fully from said peripheral edge surface;
said first wall portions extending across said deployment door and projecting inward from said panel portion;
said second wall portions surrounding said deployment door and projecting inward from said panel portion;
said mounting portions comprising means for mounting said part on the vehicle at locations spaced from the canister, said mounting portions projecting inward from said panel portion at locations between said second wall portions and said peripheral edge surface;
said mounting portions comprising mounting bosses projecting inward from said panel portion along respective central axes, said axes being parallel to each other and inclined from a vertical line at a first angle, each of said first wall portions being inclined from a vertical plane at a second angle equal to said first angle.

4. Apparatus as defined in claim 3 wherein a pair of said second wall portions are inclined from a vertical plane at a third angle equal to said first and second angles.

5. Apparatus as defined in claim 3 wherein said second wall portions intersect said panel portion at locations where said panel portion has a first thickness, each of said second wall portions having a lesser thickness and being continuous with said panel portion throughout a distance which is measured across said lesser thickness and which is not greater than 60 percent of said first thickness.

6. Apparatus for covering an inflatable occupant restraint contained in a canister in a vehicle, said apparatus comprising:

a continuous piece of a first plastic material defining a substrate, said substrate having a panel portion comprising means for closing an opening in the vehicle, said panel portion of said substrate having a peripheral edge surface and including means for defining boundaries of a deployment door which is spaced fully from said peripheral edge surface, and wall portions surrounding said deployment door and projecting inward from said panel portion; and a continuous piece of a second plastic material defining an outer layer covering said panel portion of said substrate in overlying surface contact with said panel portion, said outer layer comprising means for continuing a trim theme of the vehicle across and around said deployment door;

said wall portions of said substrate intersecting said panel portion at locations where said panel portion has a first thickness, each of said wall portions having a lesser thickness and being continuous with said panel portion throughout a distance which is measured across said lesser thickness and which is not greater than 60 percent of said first thickness.

* * * * *